United States Patent [19]

Hesseling et al.

[11] Patent Number: 5,125,770
[45] Date of Patent: Jun. 30, 1992

[54] METHOD OF STABILIZING THE SOIL AND PREVENTING EROSION

[75] Inventors: Henderik Hesseling, Veendam; Andries Kraak, Eelde, both of Netherlands

[73] Assignee: Coöperatieve Verkoop- en Productievereniging van Aardappelmeel en Derivaten AVEBE B.A., Netherlands

[21] Appl. No.: 593,111

[22] Filed: Oct. 5, 1990

[30] Foreign Application Priority Data

Oct. 6, 1989 [NL] Netherlands ............ 8902484

[51] Int. Cl.⁵ ............................................ E02D 3/12
[52] U.S. Cl. ................................... 405/263; 106/900; 47/9; 405/264
[58] Field of Search ............ 405/264, 263, 128, 129; 106/600, 633; 166/292, 285

[56] References Cited

U.S. PATENT DOCUMENTS

| | | | |
|---|---|---|---|
| 2,436,146 | 2/1948 | Kleinicke | 405/264 X |
| 2,754,623 | 7/1956 | Mowry et al. | 47/9 |
| 2,968,572 | 1/1961 | Peeler | 405/264 X |
| 2,981,162 | 4/1961 | Davidson et al. | 405/264 X |
| 3,131,074 | 4/1964 | Thompson | 405/264 X |
| 3,223,163 | 12/1965 | Koch et al. | 405/264 |
| 3,281,987 | 11/1966 | Scott | 47/9 |
| 3,677,014 | 7/1972 | Stout et al. | 405/264 |
| 3,865,600 | 2/1975 | Pearson et al. | 405/264 X |
| 3,887,506 | 6/1975 | Hewitt | 405/264 X |
| 4,022,633 | 5/1977 | Schneider | 405/264 X |

Primary Examiner—Dennis L. Taylor

[57] ABSTRACT

The invention relates to a method of stabilizing the soil and preventing erosion. According to the invention such a method is characterized by treating the soil with a mixed product of a pre-gelatinized starch and 0.5-5% by weight, calculated on the dry starch, of a surfactant compound which contains an unbranched saturated alkyl group and is selected from the alkyl sulfates having 10-16 carbon atoms, the alkyl sulfonates having 10-16 carbon atoms and the fatty acid alcohols having 8-12 carbon atoms. The invention also relates to said mixed product.

7 Claims, No Drawings

METHOD OF STABILIZING THE SOIL AND PREVENTING EROSION

The present invention relates to the stabilization of the soil by treating the surface of that soil with a mixture of a pre-gelatinized starch and certain surfactant compounds.

Erosion of the soil is a major problem throughout the world. On account of its small particle size and its poor cohesion, finely-divided solid matter is sensitive to erosion. Such finely-divided matter is found in agricultural lands, dunes, at construction sites, in roads under construction, and in accumulations of sand, organic matter, inorganic matter, and waste matter. Erosion of the soil can occur under the influence of wind and rain.

Erosion by wind causes the drifting of masses of dust. Erosion by wind causes the inconvenience of dust formation, the loss of valuable matter (humus, sowing seed, fertilizer, plantlets), and problems at building projects. Dust storms are a danger to traffic and a nuisance to persons staying at houses in the vicinity. Due to the drift of agricultural soil, sowing-seed, humus, and fertilizer can be blown away. In a later stage of plant growth, during dry periods, young plants are exposed as a result of erosion by wind, while the plantlets in locations out of the wind are covered by a layer of sand. Moreover, the plantlets are damaged by the abrasive action of the sand. In all of these cases the growth of young plants is seriously impeded or even made impossible.

Erosion of the soil by rain can be caused by excessive rain, with the soil being washed away. In the process agricultural soil containing matter such as humus, sowing-seed, fertilizer or plantlets is washed away. Further, due to the influence of erosion by rain, the unprotected slopes of ditches, channels, dunes and roads may cave in. In numerous cases, therefore, it is extremely important to prevent or suppress erosion by wind and water.

It has been proposed to prevent the shift, drift and washing away of soil by treating the surface layers of the soil with water-dispersible high-polymeric substances of a natural or synthetic nature. Examples in this connection are starch ethers, hydrolyzed polyacrylonitril, polyvinyl alcohol and carboxymethyl cellulose. U.S. Pat. No. 3,077,054 discloses the use of polyvinyl acetate, optionally in combination with starch ethers, as anti-erosion agents. U.S. Pat. No. 3,224,867 deals with the conditioning of the soil using mono starch phosphate. M. O. Weaver et al. (Starch/Staerke, 1984, pp. 56-60) describe the use of anionic starch derivatives for stabilizing the soil. The most important drawbacks of the polymers mentioned are their high price, their relatively poor biological degradability, their environment-foreign character and/or their potentially toxic properties. The starch ethers referred to moreover proved very sensitive to washing out by rain water. As a result, their action as an anti-erosion agent is often severely limited.

Surprisingly, it has now been found that the soil can be stabilized against erosion by water and wind by treating that soil with a mixture of a pre-gelatinized starch and 0.5-5% by weight, calculated on the dry starch, of a surfactant compound containing an unbranched, saturated alkyl group, which compound is selected from the alkyl sulfates having 10-16 carbon atoms, the alkyl sulfonates having 10-16 carbon atoms and the fatty acid alcohols having 8-12 carbon atoms.

For an important part, the stabilization of the soil is probably due to the fact that the surface layers of the soil are fixated to a certain extent. Here, the film-forming properties of the starch products to be used are of great importance. A treatment of the soil according to the method of the invention results in the formation of a poorly water-soluble, resilient crust at the surface of the mass treated, so that an excellent and relatively durable protection against wind and water erosion is obtained.

In the method according to the invention the soil is treated with a mixture of pre-gelatinized starch and certain surfactant compounds. The pre-gelatinized starch can be prepared by roller-drying starch suspensions or starch solutions or by extruding granular starch. The pre-gelatinized starch obtained is swellable in cold water. The starch used may be derived from any suitable plant, and thus includes potato starch, tapioca starch, waxy maize starch, maize starch or wheat starch. These starches may be physically, enzymatically or chemically modified. Preferably, potato starch is used.

The invention also relates to the mixed product to be used in the method, comprising pre-gelatinized starch and 0.5-5% by weight, calculated on the dry starch, of a surfactant compound which contains an unbranched saturated alkyl group and is selected from the alkyl sulfates having 10-16 carbon atoms, the alkyl sulfonates having 10-16 carbon atoms and the fatty acid alcohols having 8-12 carbon atoms.

The dispersibility and the film-forming characteristics of the pre-gelatinized starch can optionally be improved by adding, before roller-drying or extruding, alkaline substances, for example aqueous ammonia solutions, and/or boron compounds, for example borax to the starch. As a surfactant, preferably sodium lauryl sulfate is used. Optionally, yet other substances can be admixed with the pre-gelatinized starch, for instance water glass. Mixing the pre-gelatinized starch and the surfactant can be performed using any suitable mixing apparatus. Preferably, the surfactant is added to the pre-gelatinized starch in liquid condition, for example as an aqueous dispersion or as a molten product. The mixed product obtained is preferably in the form of an air-dry powder. A characteristic feature of the mixed product is that the product cannot be dissolved in water but yields an aqueous dispersion of swollen particles. These aqueous dispersions preferably have an alkaline pH, for example a pH between 9 and 11 in a dispersion of 5% by weight of mixed product in demineralized water.

The mixed product to be used according to the invention can be applied to the soil to be treated as an air-dry powder or as an aqueous dispersion. When used for drift-sensitive, sand-containing grounds, the mixed product is preferably applied in the form of an aqueous dispersion with a dry-matter content of for instance 1-20%. The aqueous dispersion can be sprayed onto the soil to be treated via a spray boom or from a liquid manure spray comprising a pump and a splash plate. Broadcasting the mixed product in powder form is a possibility in some cases when sufficient dew formation enables the formation of a dense crust-like top layer. The amount of mixed product to be applied is strongly dependent on the nature of the soil to be treated and is preferably between 5 and 50 g of mixed product (dry matter) per square meter of soil.

When the mixed products are being spread across the surface of the soil, the aqueous dispersion of the dry powder may contain various diluents or other additives. Examples in this connection are: sand, earth, clay, marl, chalk, bentonite, phosphates, mixed manure, agricultural chemicals, and trace elements.

The mixed products used according to the invention form a protective crust together with the surface layer of the soil. It is true the adhesive starch particles swell up, but they do not lose their adhesive capacity. Reduced activity as a result of downward washing out due to rain will hardly occur, if at all. After drying the crust in the top layer recovers virtually completely. The granular components of the soil are bonded in such a way that the crust retains an open structure. Air- and water-permeability are sufficiently maintained. The sprouting of young plants is not impeded by the crust formed at the surface.

A great advantage of the starch products to be used according to the invention is their biological degradability, which is only temporarily impeded by the surfactant component present. After about 4–6 weeks the mixed product appears to have lost its activity. Then begins the natural uptake of the starch into the soil environment under the influence of various microorganisms. Although the treatment can be repeated then, the growth that has meanwhile developed will mostly provide for further resistance to erosion by water and wind.

The invention will now be further explained in and by the following Examples.

EXAMPLE I 140 l of an aqueous solution containing 25% by weight of ammonia and 100 kg borax.aq. were added to 9000 l aqueous potato starch suspension of 22° Bé. The mass is gelatinized on heated rollers and dried. The roller-dried product is mixed with 227 kg sodium water glass solution of 50° Bé and 337 kg of an aqueous solution containing 30% by weight of sodium lauryl sulfate. The product obtained is then ground. The mixed product thus obtained is used for the prevention of soil erosion.

With moderate agitation 250 kg of the mixed product is added to 5000 l water in the storage tank of a spraying device. With intermittent agitation, after 30 min a ready-to-spray dispersion has formed of a viscosity suitable for further handling. Using a 2×9 m spray boom which is moved across a building site at a moderate speed, the suspension is distributed across the surface. The speed of the spraying device is adjusted so that about 2.5 kg of the mixed product is applied per are. After drying a tangible crust with an open structure is formed, effectively resisting drift up to wind velocities of 75 km/h. After several showers the protective effect is still well maintained.

EXAMPLE II

The mixed product according to Example I is mixed with an equal amount of mixed-manure matter. By means of a mechanical manure spreader the dry mixture is spread across the surface of the land in an amount of 500 kg/hectare. Carrot seed is sown in rows in the field thus reared. The surface is then sprinkled with water by means of a sprinkler device. The sprinkling is repeated at intervals so as to maintain optimum growing conditions. The carrot seed sprouts and prospers. The dry top layer which is formed in the periods between the sprinkling phases proves to be drift-insensitive to winds of velocities up to ca. 75 km/h.

EXAMPLE III

The mixed product prepared according to Example I is spread across a drift-sensitive soil surface as a dry powder in an amount of 300 kg/hectare. A mechanical manure spreader is used for this purpose. After just one morning of heavy dew sufficient bonding between the soil particles has taken place for a crust to begin to form which can effectively prevent erosion by wind. After a few periods of dew the formation of crust is yet further enhanced to a considerable extent. For an optimal effect through the method of dry application it is important that much attention be paid to a very homogeneous spread.

EXAMPLE IV

A clean vacuum manure tank is filled with 10,000 l water. At the same time, in the vacuum inlet system provided, 500 kg powdered mixed product from Example I is dispersed via an injection venturi. Agitation can be continued both mechanically and with injected air. The homogeneous dispersion is ready for use after 30 min. The spreading across the ground surface is carried out using the standard spray nozzle and splash plate. The spraying width is 12–18 m at 1.75 ato. In this manner the starch product is easily applied on a large scale with sufficiently homogeneous distribution. One tankful is sufficient for the treatment of a surface of 2 hectares. Erosion by wind is thus strongly inhibited.

EXAMPLE V 100 g of the roller-dried product mixed with sodium water glass solution, is mixed with 2 g of a surfactant compound suitable according to the invention. The suitability of the obtained products as anti-erosion agents can be tested by means of standard tests. Their film-forming properties and the film-solubility (moisture-resistance) are particularly important here. To assay these properties first dispersions of 5% by weight of mixed product are prepared by agitating with tap water for 30 min. Film of a thickness of about 1.5 mm of these dispersions are smeared on a polyethylene foil-covered glass plate. Then these films are dried in the oven at 50° C.

Film formation: The film formation is sufficient when the swollen dispersed particles deliquesce during drying in such a way that a more or less closed film is formed.

Film solubility: After the dried film is broken into particles smaller than 2 mm, 0.50 of the product is weighed in a small glass beaker (50 ml, tall model). After the addition of 25 ml demineralized water, the dispersion is agitated at room temperature for 30 min using a magnet agitator (length 2 cm). The dispersion obtained is transferred to a centrifugal tube and centrifuged at 300 rpm for 10 min. The supernatant is then decanted. The residual undissolved fraction is quantitatively transferred to a small weighed dish, followed by drying at 120° C. in an oven until virtually all water has evaporated. Then it is determined by weighing how many grams of dry product the undissolved fraction contains (=y g). The film solubility (in %) is then defined as:

$$100 - \frac{100 \times y}{0.50} \%$$

Suitable mixed products possess a film solubility of less than 50% and preferably less than 25%.

The results for a number of surfactants are shown in Table A.

TABLE A

Film formation and film solubility of mixed products

| Surfactant substance | Film formation | Film solubility |
|---|---|---|
| Na-n-decyl sulfate | reasonable | 48% |
| Na-dodecyl sulfate | reasonable | 16% |
| Na-n-tridecyl sulfate | reasonable | 18% |
| Na-n-tetradecyl sulfate | moderate | 14% |
| Na-n-hexadecyl sulfate | moderate | 10% |
| Na-1-dodecane sulfonate | moderate | 28% |
| Octanol | reasonable | 44% |
| 1-Decanol | reasonable | 10% |
| 1-Dedecanol | reasonable | 18% |

We claim:

1. A method of stabilizing soil and preventing erosion, characterized by treating the soil with a mixed product of a pre-gelatinized starch and 0.5-5% by weight, calculated on the dry starch, of a surfactant compound which contains an unbranched saturated alkyl group consisting of the alkyl sulfates having 10-16 carbon atoms, the alkyl sulfonates having 10-16 carbon atoms, and the fatty acid alcohols having 8-12 carbon atoms.

2. A method as claimed in claim 1, characterized by using sodium lauryl sulfate as a surfactant compound.

3. A method as claimed in claim 1, characterized in that the mixed product contains 0.1-3% by weight of sodium borate, calculated on the dry starch.

4. A method as claimed in claim 1, characterized by treating the soil with an aqueous dispersion of the mixed product.

5. A method as claimed in claim 4, characterized in that an aqueous dispersion of the mixed product has an alkaline pH.

6. A method as claimed in claim 1, characterized by treating the soil with the mixed product in powder form.

7. A method as claimed in claim 1, characterized in that the starch product has been derived from a potato plant.

* * * * *